March 27, 1962    W. J. BONNER    3,026,565
EXTRUDER HEAD FOR HOLLOW PRODUCTS
Filed Jan. 4, 1961    2 Sheets-Sheet 1
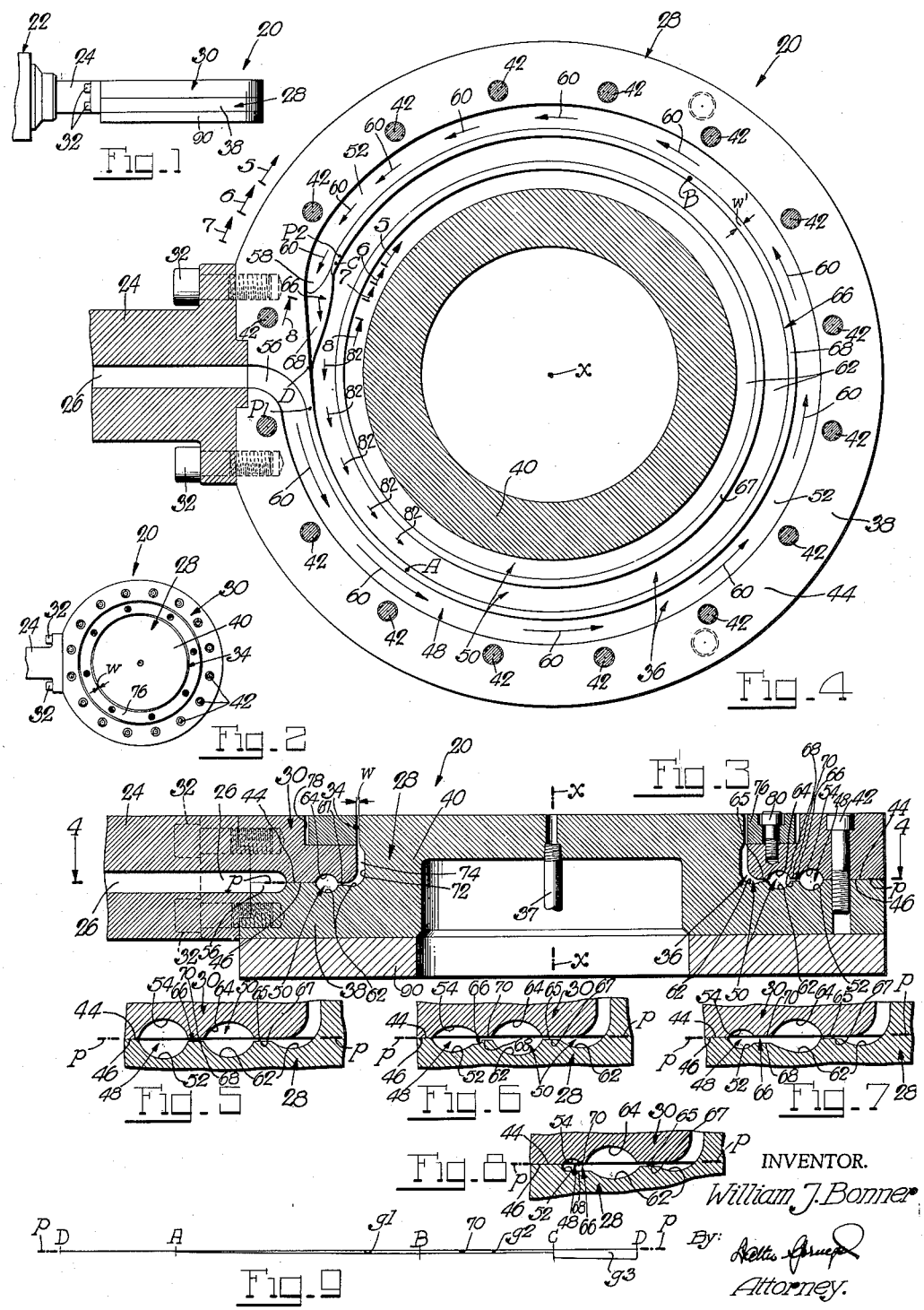
INVENTOR.
William J. Bonner
By: [signature]
Attorney.

March 27, 1962  W. J. BONNER  3,026,565

EXTRUDER HEAD FOR HOLLOW PRODUCTS

Filed Jan. 4, 1961  2 Sheets-Sheet 2

INVENTOR.
William J. Bonner
BY
Attorney

United States Patent Office 3,026,565
Patented Mar. 27, 1962

3,026,565
EXTRUDER HEAD FOR HOLLOW PRODUCTS
William J. Bonner, Ashaway, R.I., assignor to Franklin Research and Development Corporation, Mystic, Conn., a corporation of Delaware
Filed Jan. 4, 1961, Ser. No. 80,591
11 Claims. (Cl. 18—14)

This invention relates to extruder heads in general, and to extruder heads for forming hollow plastic products in particular.

Extruder heads of the type with which the present invention is concerned are widely used in extruding continuous plastic film in tubular form or in covering electric wire or cable with insulation, for example. In these and also other applications of an extruder head of this type, the uniformity of the wallthickness peripherally throughout of the tubular plastic emerging from the die aperture thereof is of the greatest importance since any considerable unevenness thereof may well result in an inferior, if not useless, product. With an extruder discharging plastic into its head in a solid stream or mass, the head is customarily designed to direct the admitted plastic into tubular flow at a volumetric rate which peripherally throughout is as nearly uniform as possible on its progress toward, and hence before it reaches, the die aperture which determines the shape and size of the extruded tubular plastic but has no control over the uniformity of its wallthickness in any extended extrusion cycle. To this end, known prior extruder heads are designed to direct the admitted plastic partly into helical and partly into straight flow paths toward the die aperture, with the flowing plastic thus divided joining before the die aperture into straight tubular flow at substantially uniform rate throughout.

While these prior extruder heads perform satisfactorily in many applications, they do have inherent characteristics which impose operational limits upon them and decrease the accuracy or efficiency, or both, of their performance in other applications. This is due to the underlying concept of these prior extruder heads to achieve, by selected divided flow of the admitted plastic in helical and straight paths, delivery of the plastic into, and at any instant uniformly throughout, a tubular passage continuous with and leading from the exits of these paths to the die aperture. Nevertheless, since the flow resistance encountered by the plastic in the respective helical and straight paths is invariably different, it stands to reason, and it has been found, that while plastic of a certain viscosity will be delivered to the continuing tubular passage fairly uniformly throughout at any instant, the same or a different plastic of considerably different viscosity will not be so uniformly delivered. Thus, a prior extruder head of this type, while satisfactory for the extrusion of plastic of a viscosity in a range within which its viscosity may safely fluctuate in an ordinary continuous extrusion operation, will not be satisfactory for the extrusion of the same or a different plastic of a viscosity more or less considerably outside of this range. Furthermore, it is extremely unlikely that the straight and helical flow paths into the tubular passage to the die aperture, no matter how arranged, will afford that critical control over the overall flow of the plastic which alone would result in delivery of the same into this tubular passage at a truly uniform volumetric flow rate throughout. Accordingly, such control over the overall flow of the plastic to the die aperture as is afforded by these prior extruder heads, coupled with the consistency or viscosity of the plastic to be extruded and frequently also with a relief formation and following constriction in the tubular passage to the die aperture for substantially uniform distribution of the plastic throughout the relief formation by back-pressure, are relied upon for delivery of the plastic to the die aperture at a flow rate which is peripherally throughout sufficiently uniform to produce a hollow or tubular product of substantially uniform wallthickness. However, while these expediencies are adequate in many applications of the prior extruder heads, they become more and more inadequate with increasing changes in the feed rate or consistency, or both, of a plastic or plastics, or with increasing reduction of the required wallthickness of an extruded product or increasing cross-sectional size of the latter, or both.

It is the primary aim and object of the present invention to provide an extruder head of this type which has neither the operational limits nor decreased accuracy or efficiency in performance of the prior extruder heads of this type in the applications in which the latter are thus deficient, and which by and large is in its accuracy and efficiency of performance quite superior to these prior extruder heads in any and all applications, yet involves no more cost than these prior heads.

It is another object of the present invention to provide an extruder head of this type into which plastic is admitted to flow therein initially in a plane normal to, and in a sharply defined endless, and more usually circular, path substantially completely about, the axis of the die aperture, and to be redirected at one side of and throughout this circular path substantially at an abrupt right-angle turn into a tubular path about this axis and leading to the die aperture. In thus arranging the flow paths of the plastic in the extruder head, the flow direction at least of the plastic at any place in the head is such as to preclude piling of plastic in varying amounts at a local place or places peripherally of the tubular path as a prerequisite to achieving throughout the latter plastic flow at a uniform volumetric rate.

It is another object of the present invention to provide an extruder head of this type in which substantially equal amounts of plastic are at any instant displaced from the aforementioned initial path throughout its circular extent into the following tubular path, by providing at the entry end of the latter a circular constriction the width of which is so graduated peripherally thereof as to achieve this objective. With this further arrangement of the extruder head, there is met the other and solely remaining prerequisite to achieving throughout the tubular path plastic flow at a uniform volumetric rate.

It is a further object of the present invention to provide an extruder head of this type in which the admitted solid stream of plastic is relentlessly and uniformly urged on to the die aperture and no part thereof is permitted to lag back or become temporarily trapped therein, by ending the aforementioned circular path just short of, and blocking it from rejoining itself at, its inlet and, instead, leading it thereat into the tubular path through a restriction appropriate to there achieve also plastic flow into the tubular path at the same uniform volumetric rate as throughout the remainder of the latter. With this further arrangement of the extruder head, the same will perform with utmost accuracy and efficiency for most any extended extrusion operation, and the extruded product, and even a continuous one, will be of top quality by being most uniform in texture and dimensions and free from weld marks or other blemishes.

Another object of the present invention is to provide an extruder head of this type in alternative forms, in a first form of which the plastic is displaced from the aforementioned circular path into the following tubular path in the direction of the axis of the die aperture, and in the second form of which the plastic is thus displaced into the tubular path radially of this axis, with the tubular path of this second form converging from the circular path inwardly toward, and then continuing to the die aperture in the direction of, this axis. Alternative forms of the extruder head best suited or preferred for particular applications are thus available. Also, since in the aforementioned second form of the head the circular path surrounds, and hence is of larger peripheral extent than, the tubular path, the aforementioned constriction between both paths is also of larger peripheral extent than the tubular path and, hence, permits greater latitude in the graduation of its width to make for displacement of plastic at a quite uniform volumetric flow rate into the tubular path peripherally throughout. Furthermore, the flow rate of plastic circularly in the initial path of presently largest peripheral extent is particularly low which further enhances plastic displacement at a volumetric flow rate of optimum uniformity into the tubular path peripherally throughout.

A further object of the present invention is to provide an extruder head of the aforementioned second form in which the part of the tubular path extending axially of the die aperture is relatively short, thereby permitting the construction of the extruder head at minimum length axially of the die aperture and, hence, the application of heating provisions in close proximity to the flow paths therein for quick heating of the same to operating temperature after a standstill.

It is another object of the present invention to provide an extruder head of the aforementioned second form which is made up of two sections that are partible in a plane normal to the axis of the die aperture in which lie the circular path and the inwardly converging part of the tubular path as well as the constriction between both paths. With this arrangement of the extruder head, the circular flow path and the inwardly converging part of the tubular flow path as well as the constriction between both flow paths may advantageously be provided by complemental, and accordingly shallow, machined formations in the parting surfaces of both sections, and more importantly, ready parting of one section from and reassembly with the other section makes for minimum down-time of the head for cleaning and other maintenance purposes.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a side view of a mounted extruder head embodying the present invention;

FIG. 2 is a top view of the mounted head;

FIG. 3 is an enlarged section through the same head;

FIG. 4 is a section through the head taken substantially on the line 4—4 of FIG. 3;

FIGS. 5 to 8 are enlarged fragmentary sections taken substantially on the lines 5—5, 6—6, 7—7 and 8—8, respectively, of FIG. 4;

FIG. 9 is a diagrammatic illustration of a certain constriction in the flow path through the head;

Figure 10:
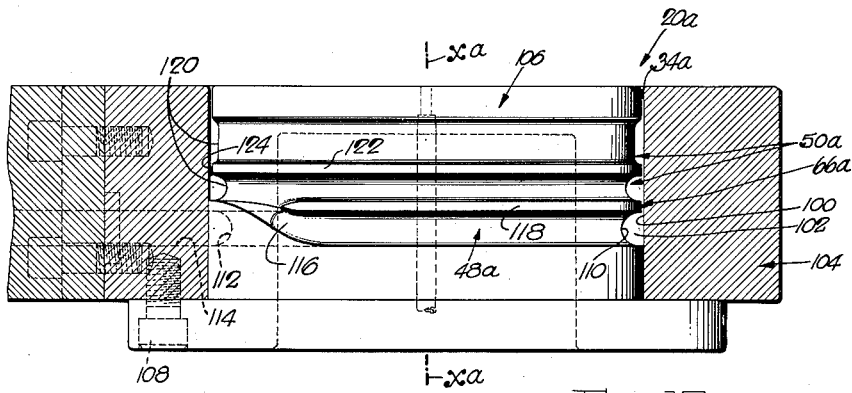
FIG. 10 is a view, partly in section and partly in elevation, of a mounted extruder head embodying the present invention in a modified manner.

Referring to the drawings, and more particularly to FIGS. 1 to 4 thereof, the reference numeral 20 designates an extruder head which is suitably mounted at the discharge end of an extruder 22 (FIG. 1), presently through intermediation of an adapter 24 which through a passage 26 delivers the plastic charge from the extruder to the head. The head 20 comprises, in the present instance, a body 28 and a ring formation 30 which in their assembled relation are mounted on the adapter by screws 32.

The body 28 and ring formation 30 together form a die aperture 34 and a flow passage 36 from the adapter 24 to the die aperture, with the flow passage 36 being arranged to deliver plastic to the die aperture 34 at a uniform rate peripherally throughout the latter. In the exemplary head 20, the die aperture 34 is tubular and presently of annular outline about the body axis $x$, and its width $w$ at the discharge end thereof is quite small in comparison to its diameter (FIGS. 2 and 3) for the extrusion of a tubular product of correspondingly large diameter and small wallthickness. The present head 20 may thus be used, for example, for blowing extruded plastic film, such as polystyrene, into continuous thinwall tubing in accordance with a method like or similar to that disclosed in United States Patent No. 2,461,975. For this exemplary use of the present head 20, the same is presently provided with a conduit 37 (FIG. 3) through which to conduct air under pressure into the tubing being formed.

The body 28 has, in the present instance, a disc-like base 38 and a centrally projecting core formation 40, and the ring formation 30 is mounted by screws 42 on the base 38 and surrounds the core formation 40 in uniformly spaced relation throughout to form therewith the die aperture 34. The body 28 and ring formation 30 have machined surfaces 44 and 46 which in the assembled head rest against each other and lie in a plane $p$ normal to the body axis $x$ (FIG. 3).

It is a feature of the present head 20 that all plastic passing through the flow passage 36 therein proceeds initially in a plane normal to, and in a nearly endless, presently circular flow path about, the axis of the die aperture which presently is coincident with the body axis $x$, and the plastic thus proceeding in this circular flow path is displaced from the same substantially throughout its circular extent at an abrupt, substantial right-angle, turn into a tubular flow path about this axis and leading to the die aperture. The circular and tubular flow paths just mentioned of the flow passage 36 are designated by the reference numerals 48 and 50, respectively.

The circular flow path 48 is presently formed by machined complemental grooves 52 and 54 in the confronting surfaces 44 and 46 of the body 28 and ring formation 30. These complemental grooves 52 and 54 form a side inlet 56 in communication with the passage 26 in the adapter 24, and otherwise extend circularly about the body axis $x$ for less than one turn to end at 58 near, but short of, the inlet 56 (FIG. 4). The ring formation 30, which is shown in FIG. 3, is omitted in FIG. 4 for clearer illustration of the extent of the circular flow path 48 by its one groove 52, it being understood that both complemental grooves 52 and 54 of the circular flow path 48 are presently of identical cross-sectional shape and size throughout, except at their end 58 as will appear hereinafter. It thus follows from FIG. 4 that plastic admitted into the circular flow path 48 will flow circularly therein in the direction of the arrows 60 and also in the plane $p$, in accordance with the aforementioned featured initial flow of plastic in the head 20.

The flow path 50, which is called "tubular" for a reason explained hereinafter despite its exemplary location in the plane p (FIG. 3), is presently formed by grooving 62 and 64 in the confronting surfaces 44 and 46 of the body 28 and ring formation 30. This tubular flow path 50, which extends circularly about the body axis x (FIG. 4) and is of identical cross-sectional shape and size throughout (FIG. 3), has in the present instance an intermediate annular constriction 65 formed by a raised land 67 in the groove 62 in the body 28 and the confronting surface 46 of the ring formation 30.

Intermediate the circular and tubular flow paths 48 and 50 is a constricted flow path 66 through which the plastic is displaced from the circular flow path 48 into the tubular flow path 50 at the aforementioned featured abrupt right-angle turn. This constricted flow path 66 is presently formed by complemental lands 68 and 70 on the body 28 and ring formation 30 which are of identical width w' (FIGS. 3 and 4) over their circular extent about the axis x from the point P1 counterclockwise to the point P2 (FIG. 4), and are of gradually varying width from the point P2 to the point P1 in the same counterclockwise direction (FIGS. 4 to 8). The constricted flow path 66 defined by the lands 68, 70 is in the form of a narrow gap between the latter which in the present example extends from the point A counterclockwise to the point D (FIG. 4) and varies in the exemplary manner shown diagrammatically in FIG. 9. Thus, the gap is zero in the region between points D and A (FIGS. 4 and 9), starts and gradually widens from point A to point B, remains at uniform width between points B and C and is widest between points C and D. To this end, the land 70 on the ring formation 30 lies presently throughout in the plane p (FIGS. 3 and 5 to 9), while the land 68 on the body 28 is machined so that the same will rest against the land 70 between the points D and A to form the zero gap thereat, will gradually recede from the plane p from the point A to the point B to form the gradually increasing gap g1 thereat, will continue at the same uniform level between the points B and C to form the uniform gap g2 thereat, and will drop to even lower levels between the points C and D to form the largest gap g3 thereat. Looking at FIGS. 4 and 5 to 8, the exemplary part of the constricted flow path 66 between the points C and D may also be considered as a constricted lead-over of the circular flow path 48 at its end 58 into the tubular flow path 50, for the circular flow path 48 of gradually diminishing cross-sectional area thereat combines with the gradually more receding land 68 thereat to form the largest gap g3 between these points. However, for consistent description of the constriction at the gap g3 in the path of the flowing plastic, this constriction is presently considered to be a part of the constricted flow path 66.

The described tubular flow path 50 leads to the die aperture 34 which may be considered to extend substantially from the base 38 between the core formation 40 and surrounding ring formation 30. On the other hand, since the core formation 40 is in the present example undercut at 72 to form with the surrounding ring formation 30 thereat a relief passage 74 of larger cross-sectional area than the following, more constricted discharge end of the die aperture 34, the relief passage 74 may also be considered a continuation of the tubular flow path 50 leading to the die aperture proper 34 of the uniform width w throughout (FIG. 3). The die aperture proper is presently formed by an endlength of the core formation 40 on the body 28 and a separate die ring 76 which is held in an annular recess 78 in the ring formation 30 by clamping screws 80 with sufficient clearance from the latter to permit its accurate location for obtaining the same uniform width w of the die aperture throughout its peripheral extent.

In the aforementioned exemplary use of the present head 20 in forming continuous plastic tubing, plastic is continuously discharged from the extruder through the adapter 24 into the head 20 wherein it flows through the passage 36 to the die aperture 34 from which it emerges, in the present example as thin-wall tubing of relatively large diameter. Considering first the flow pattern of the plastic in the circular flow path 48, plastic will flow therein circularly in the direction of the arrows 60 (FIG. 4) throughout the extent of this path, but plastic will also be displaced through the constricted flow path 66 from its start at the point A to its end at the point D. Thus, owing to the fact that the plastic in the circular flow path 48 is under pressure, it is inevitable that some plastic therein will be displaced therefrom into the constricted flow path 66 throughout its extent. Furthermore, the described exemplary graduation of the gap of the constricted flow path 66, including the part thereof between the points C and D, is such that this gap becomes wider as the flow of plastic circularly in the path 48 slows down more and more as displacement of plastic into this gap progresses more and more circumferentially thereof, so that there is achieved the prime objective of delivery of plastic into the tubular flow path 50 at a substantially uniform volumetric flow rate throughout the latter. Also, and in accordance with another prime objective, the plastic is to be displaced into the tubular path 50 at an abrupt, substantial right-angle, turn from its preceding flow circularly in the path 48. To this end, the gap of the constricted flow path 66 over the far greater part of its peripheral extent, presently from point A to point C, while varying as described, is nevertheless kept relatively small, while the part with the widest gap of the constricted flow path between the points C and D is kept peripherally as short as possible. As a result, the friction encountered by the displaced plastic in the narrow gap of the constricted flow path 66 between the points A and C will compel this plastic to flow therein and into the tubular path 50 substantially radially of the axis x, while the plastic displaced through the widest gap of the constricted flow path between the points C and D will flow therein and into the tubular path 50 thereat circularly of the latter in the direction of the arrows 82 as well as radially of the axis x (FIG. 4), as will be readily understood. It is for the purpose of permitting and compelling diversion of the circularly flowing part of the plastic in the tubular flow path 50 into radial flow therein at a rate commensurate with the ojective of achieving delivery of plastic into this tubular flow rate at a substantially uniform volumetric flow rate throughout, that the constricted flow path 66 has in that region the zero gap, presently between the points D and A. The displacement of plastic through the constricted flow path 66 into the tubular flow path 50 may thus be visualized as a rapid radial ribbon flow of small thickness at the point A and continuing gradually less rapid radial ribbon flow of increasing thickness to the point C, followed by a relatively short and considerably slower ribbon flow of largest thickness both circularly about and radially of the axis x with the circular plastic flow soon fully diverted into radial flow. It is because the flow of plastic in the flow path 50 is predominently radially of the axis x in contrast to the predominent circular flow of the plastic in the flow path 48 that the flow path 50 has been called "tubular." For the same reason, the constricted flow path 66 may also be called "tubular."

The plastic thus delivered into the tubular flow path 50 at a substantially uniform volumetric flow rate throughout the latter will continue to the die aperture 34 at a rate which is uniform at and throughout each cross-section of the remaining flow passage 36 and die aperture 34. The intermediate constriction 65 in the tubular flow path 50, which in itself is a well-known expediency and is not absolutely necessary, will assist in achieving optimum uniformity of the volumetric flow rate of the plastic peripherally throughout this tubular flow path and to the die aperture 34. Similarly, the relief passage 74 just prior to the die aperture proper 34 of narrower width, which also is a well-known expediency and is not absolutely necessary, will assist in achieving optimum uniformity of the volumetric flow rate of the plastic in the die aperture peripherally throughout the same.

The foregoing description of the exemplary head 20 points at the true gist and essence of the same, this being the formation in the head of a through-passage providing a tubular die aperture with a longitudinal axis, an inlet, first and second flow paths leading from the inlet and to the die aperture, respectively, with the first flow path extending in a plane normal to this axis and about the latter for less than one turn to end near but short of the inlet, and the second flow path being tubular and in line with the die aperture, and a constricted tubular communication passage between these paths and in line with the second path to admit plastic into the latter for its flow therein at a substantially uniform rate peripherally throughout. Thus, the primary feature of the present head 20 which alone would achieve the objective of delivery of plastic to the die aperture at a substantially uniform volumetric flow rate peripherally throughout is the provision of an initial flow path with an inlet and extending in a plane normal to the axis of the die aperture about this axis for less than one turn to end short of the inlet, a tubular flow path about this axis and in line with the die aperture, and a constricted communication passage between these flow paths and in line with the tubular flow path and with its constriction suitably graduated to achieve delivery of plastic into the tubular path at a substantially uniform rate peripherally throughout the latter. In this connection, the specific arrangement of the constricted flow path 66 in point of its partial peripheral interruption and in point of the graduation of its gap is but an exemplary one, and this specific arrangement of the constricted flow path may be widely changed in the light of the teaching herein. Just to give one example in this respect, it would be perfectly feasible to extend the open gap of the constricted flow path 66 throughout 360° and compensate by different graduation of the gap peripherally around.

Extruder heads, such as that shown in FIGS. 1 to 4 or similar ones, have been found to perform most accurately and efficiently, regardless of the diameter or width of the die aperture. Thus, an extruder head exactly as shown and enlarged in its dimensions to have a die aperture of 12" outside diameter and 11.962" inside diameter, produced polyethylene tubing of the same outside and inside diameters and a uniform wall-thickness of 16 thousands of an inch peripherally throughout, with the extruded tubing being blown into a still larger diameter, up to and beyond twice its diameter, for corresponding further reduction of its wallthickness and with the final reduced wallthickness of the tubing being also most uniform throughout. In this particular head, the gap of the constricted flow path 66 at point B and from point B to point C (FIGS. 4 and 9) was 0.25" wide, and the gap of the same flow path between points C and D was .065" at its widest. It has also been found that this head was not in any way adversely affected in its accurate performance, and particularly in its formation of tubing with a most uniform wallthickness throughout, by even exceptional fluctuations of the viscosity of the plastic. The present head 20 is further advantageous in that by virtue of its relatively short construction in axial direction a heating unit 90 may be mounted thereon in close proximity to the flow paths therein for quick heating of the head to operating temperature after a standstill. Also, since in the present head 20 the circular flow path 48 surrounds, and hence is of larger peripheral extent than, the tubular flow path 50, the constricted flow path 66 between them is also of larger peripheral extent than the tubular flow path 50 and, hence, permits greater latitude in the graduation of its gap to make for displacement of plastic at a quite uniform volumetric flow rate in the tubular flow path 50 peripherally throughout. Furthermore, the flow rate of the plastic circularly in the initial flow path 48 of presently largest peripheral extent is relatively low, which further enhances plastic displacement at a volumetric flow rate of optimum uniformity in the tubular flow path 50 peripherally throughout. Moreover, the formation of the present head 20 in two sections 28 and 30 which are partible at their machined surfaces 44 and 46 in a plane normal to the axis of the die aperture in which lie the circular flow path 48 and the inwardly converging tubular flow path 50 as well as the constricted flow path 66 therebetween, permits the formation of these flow paths advantageously by complemental, and accordingly shallow, machined formations in the parting surfaces of both sections, and more importantly, permits ready parting of one section from and reassembly with the other section for minimum down-time of the head for cleaning and other maintenance purposes. Also, while the present head 20 is arranged for the extrusion of plastic tubing of cylindrical form, the same may in self-evident manner be arranged for the extrusion of plastic tubing of different cross-sectional shapes, such as oval shape, for example, with the wallthickness of the tubing being as uniform throughout as in extruded cylindrical tubing.

FIG. 10 shows a modified extruder head 20a which is constructed according to the underlying principle of the described head 20 and has most of the advantages of the latter and one or two advantages of its own. While in the described head 20 the plastic, except for its circular flow about the axis of the die aperture in the initial flow path 48, flows radially of this axis and then parallel to the latter to the die aperture, the flow of the plastic in the present head 20a, except for its circular flow in the initial flow path 48a, is exclusively axially of the die apertures 34a. To this end, the successive circular, constricted and tubular flow paths 48a, 66a and 50a are formed by the smooth wall 100 of a cylindrical opening 102 in a head member 104 and machined formations on the periphery of a core member 106 which is fittedly received in one end of the opening 102 in the head member 104 and releasably secured to the latter by screws 108. The machined formation on the core member 106 which together with the cylindrical wall 100 defines the initial circular flow path 48a, is a peripheral groove 110 in the core member which at 112 has an inlet in communication with a flow passage 114 in the head member 104 through which plastic from an extruder is supplied to the flow paths in the head. The peripheral groove 110 extends circularly about the axis xa of the die aperture for less than one turn to end at 116 near but short of the inlet 112. As shown, the end 116 of the peripheral groove 110 swerves from the plane of the latter toward the constricted flow gap 66a. The machined formation on the core member 106 which together with the cylindrical wall 100 defines the constricted flow path 66a, is a peripheral land 118. This land 118 may be arranged to form with the cylindrical wall 100 a circumferential graduated gap similar to that of the constricted flow path 66 of the head 20. Finally, the machined formation on the core member 106 which together with the cylindrical wall 100 defines the tubular flow path 50a, is a peripheral groove formation 120 in the core member which presently is interrupted by an intermediate land 122 that forms a constriction 124 in the tubular flow path 50a.

The operation of the present head 20a is self-evident in view of the described operation of the head 20 of FIGS. 1 to 4 and, hence, requires no further explanation. The present exemplary head 20a may have the same or a similar use as the head 20, namely the continuous extrusion, or even intermittent extrusion, of plastic in tubular form.

As already mentioned, the present head 20a has most of the advantages of the earlier described head 20. The present head 20a may even be preferred by some for certain applications, and perhaps also because all of the important machine operations within close tolerances for the accurate formation of the flow paths are to be performed on the same part, namely the core member 106, it being quite easy to hold the cylindrical aperture 102 in the head member 104 within close tolerances. A heater unit or units (not shown) may also be provided on the head 20a in close proximity to the flow paths therein. Furthermore, the core member 106 may endwise be removed from the head member 104 for cleaning and other maintenance purposes, although the earlier described head 20 is more advantageous in this respect.

Figure 11:
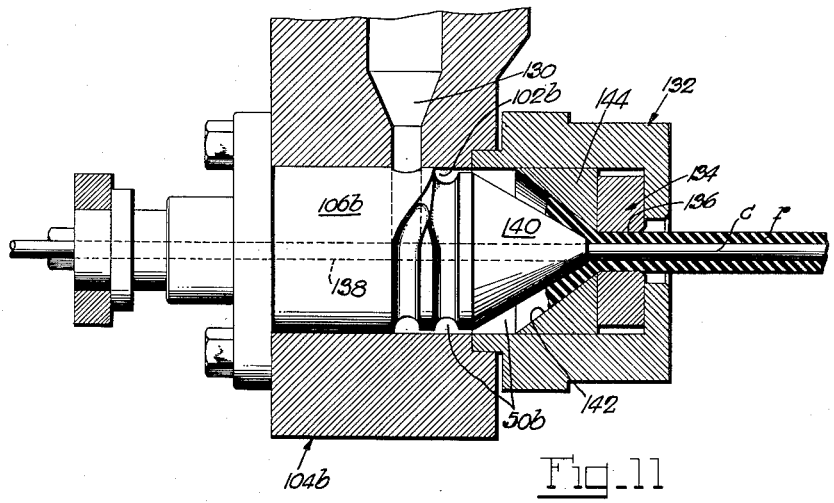
FIG. 11 is a view, partly in section and partly in elevation, of a mounted extruder head embodying the present invention in a further modified manner.

The extruder head of the modified form of FIG. 10 may also be used to good advantage for insulating electric wire or cable. Such an application is shown in FIG. 11, in which a core member 106b similar to the core member 106 of FIG. 10 is received in a cylindrical opening 102b of a side-delivery head member 104b with a flow passage 130 to the flow paths in the head. Suitably mounted on the head member 104b is a holder 132 for a die 134 having an aperture 136. The core member 106b has presently an axial opening 138 for the continuous forward feed therethrough of an electrical conductor c which combines with the die aperture 136 in forming an annular passage for the extrusion of a coat of insulation r, such as rubber, about the conductor c, with the insulation coat being of uniform wallthickness peripherally throughout. The tubular flow path 50b is in the present application in part tapered to the die aperture 136 between a tapered nose formation 140 on the core member 106b and a frusto-conical recess 142 in a die retainer 144.

If desired, the gaps of the intermediate constrictions 65 and 124 in the tubular flow paths 50 and 50a of the extruder heads 20 and 20a (FIGS. 3 and 10), and by the same token the gap of the similar intermediate constriction in the flow path 50b of the extruder head of FIG. 11, may be varied by replaceable rings thereat, and in the case of the extruder head 20 of FIG. 3 by a vertically adjustable ring thereat.

This invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. An extruder head, comprising companion parts having a through-passage providing a tubular die aperture with a longitudinal axis for extrusion of plastic in tubular form, an inlet, first and second flow paths leading from said inlet and to said die aperture, respectively, said first flow path extending in a plane substantially normal to said axis and about the latter for less than one turn to end near but short of said inlet, and said second path being tubular and in line with said die aperture, and a constricted tubular communication passage between said paths and in line with said second path and being peripherally varyingly dimensioned to admit plastic into said second path for its flow therein at a substantially uniform rate peripherally throughout.

2. An extruder head, comprising companion parts having a through-passage providing an annular die aperture with a longitudinal axis, an inlet, first and second flow paths leading from said inlet and to said die aperture, respectively, said first flow path extending in a plane normal to said axis circularly about the latter for less than one turn to end near but short of said inlet, and said second path being tubular and cross-sectionally circular and extending in line with said die aperture, and a constricted tubular communication passage between said paths and in line with said second path and being of varying width peripherally thereof to admit plastic into said second path for its flow therein at a substantially uniform rate peripherally throughout.

3. An extruder head as set forth in claim 2, in which said first path is of uniform cross-sectional area throughout and each cross-sectional area of said second path and die aperture is uniform peripherally throughout.

4. An extruder head as set forth in claim 2, in which said second path has intermediate its length an annular constriction about said axis.

5. An extruder head, comprising a body having a plane surface and a core formation about an axis normal to said surface and projecting from the latter within its peripheral confines; and a ring member on said body surrounding and spaced throughout from said core formation to form therewith a tubular die aperture, and having a plane surface resting on said body surface, at least one of said surfaces being recessed to form with the other confronting surface a first passage about said axis with an inlet thereto and a constricted passage about said axis leading from said first passage inwardly to said die aperture, said first passage extending from said inlet for less than one turn to end near but short of said inlet, and said constricted passage being of varying width peripherally thereof to admit plastic into said die aperture for its flow therein at a substantially uniform rate peripherally throughout.

6. An extruder head as set forth in claim 5, in which both of said surfaces have complemental recesses to form said first passage and inlet.

7. An extruder head as set forth in claim 5, in which said constricted passage extends for less than one turn, starting at a distance from said inlet in the flow direction in said first passage and terminating beyond said end of the latter in the same flow direction, with the width of said constricted passage being smallest at its start and largest at its termination.

8. An extruder head as set forth in claim 5, in which said constricted passage is formed in concentric outer and inner ring-like sections and an intermediate relief section of larger width than those of said outer and inner sections, said inner passage section is endless about said axis and of uniform width throughout, and said outer passage section extends for less than one turn, starting at a distance from said inlet in the flow direction in said first passage and terminating beyond said end of the latter in the same flow direction, with the width of said outer passage section varying peripherally thereof and being smallest at its start and largest at its termination.

9. An extruder head, comprising a body having an aperture with a longitudinal axis and a lateral inlet thereto intermediate its ends; and a core fittedly received in one end of said aperture and extending to the other end thereof to form therewith a tubular die opening, said core being peripherally formed to provide in said aperture first and second flow paths leading from said inlet and to said die opening, respectively, and a constricted communication passage between said flow paths, said first flow path extending in a plane substantially normal to said axis and about the latter for less than one turn to end near but short of said inlet, said second flow path being tubular and extending in line with said die opening, and said restricted passage being tubular and extending in line with said second flow path and being of varying width peripherally thereof to admit plastic into said second path for its flow therein at a substantially uniform rate peripherally throughout.

10. An extruder head, comprising a body having an aperture of circular cross-section about a longitudinal axis and a lateral inlet thereto intermediate its ends; and a core fittedly received in one end of said aperture and extending to the other end thereof to form therewith an annular die opening, said core having a peripheral groove in a plane substantially normal to said axis in communication with said inlet and a diametrically reduced length forming in said aperture a tubular passage to said die opening, as well as peripheral land intermediate said groove and reduced core length, with said groove extending from said inlet for less than one turn to end near but short of said inlet, and said land forming in said aperture a constricted communication passage between said groove and tubular passage with the width of said constricted passage being of varying width peripherally thereof to admit plastic into said tubular passage for its flow therein at a substantially uniform rate peripherally throughout.

11. An extruder head as set forth in claim 10, in which said land is so arranged in said aperture that said constricted passage extends less than one turn about said axis starting at a distance from said inlet in the flow direction in said groove and terminating beyond said end of the groove in the same flow direction, with the width of said constricted passage being smallest at its start and largest at its termination.

References Cited in the file of this patent

UNITED STATES PATENTS

| | | |
|---|---|---|
| 2,696,640 | Wienand | Dec. 14, 1954 |
| 2,788,543 | Dinsch | Apr. 16, 1957 |